July 24, 1962 J. HENRY-BAUDOT 3,046,427
MULTIPLE WINDING ELECTRIC ROTARY MACHINES
Filed Oct. 24, 1960

Inventor:
Jacques Henry-Baudot
By Kemon, Palmer & Stewart

United States Patent Office 3,046,427
Patented July 24, 1962

3,046,427
MULTIPLE WINDING ELECTRIC ROTARY MACHINES
Jacques Henry-Baudot, Antony, Seine, France, assignor to Printed Motors Inc., New York, N.Y.
Filed Oct. 24, 1960, Ser. No. 64,583
Claims priority, application France Nov. 13, 1959
3 Claims. (Cl. 310—268)

The present invention concerns improvements in multiple printed-circuit winding electric rotary machines of the kind disclosed in my co-pending application Serial No. 21,222/60, dated April 11, 1960, wherein at least one pair of printed-circuit windings is provided in a unitary rotor member, whereby said rotor windings may have not only different functions in the machine but may also have different numbers of poles. It may be stated in this later respect that a special feature is obtained when the outer one of said concentric windings is made with a number of pole pitches or steps substantially higher than that of the inner one so that when operated as a dynamotor, said composite machine delivers a current of much higher frequency than it would deliver if the number of poles were the same in both windings.

According to the present invention, in such machines, printed-circuit connections are further made between conductors of the inner and outer windings in order that the current from the inner winding also circulates through the outer one.

According to a furtther feature of the invention, the said connections and said outer windings are so provided that the outer winding is made of several loops separately fed from the inner winding, hence ipso facto a feeding with an alternating current of said outer winding whereas the inner winding may be fed with a direct current and the machine plainly operates as a D.C. to A.C. converter with a multiplied or increased frequency of the alternating current with respect to the frequency which would be obtained by the mere association of two windings as provided in the said co-pending application.

An illustrative embodiment of a machine according to the present invention is shown in the accompanying drawings, wherein.

Figure 1:
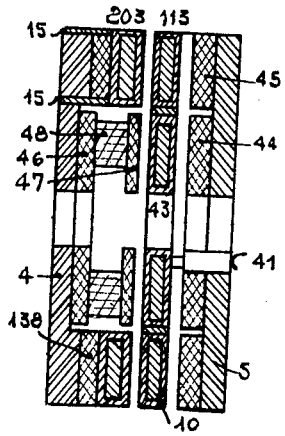
FIG. 1 is a cross-section elevation view of said embodiment, in a simplified diagram thereof.
Figure 3:
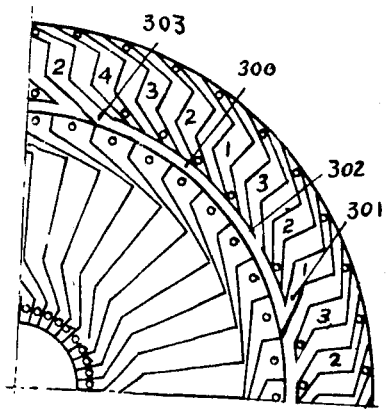
FIG. 3 is a face view of a single quadrant of the other face of said winding member.

In this embodiment, the rotor comprises a carrier dielectric sheet 10, having formed thereon the two windings, 43, being the inner one, and 113, the outer one. Opposite one face of the inner winding 43 is a ring of permanent magnet poles such as 48 mounted upon a yoke ring 46 and having polar flares 47 having the same radial dimension as the inner winding 43 and, on the opposite side of winding 43, an annular magnetic yoke provides a return path for the flux passing through the winding from magnets 48. On opposite sides of the outer winding 113 are two ferrite rings 138 and 45 and, over the ring 138, facing the said outer winding 113, is provided an annular winding 203 in which an electromotive force is induced from the rotation of said outer winding 113. On the inner winding 43 are mounted at least two brushes such as the one shown at 41. The stator mounting plates are shown at 4 and 5.

The inner part of the machine constitutes a D.C. motor of a type previously disclosed by applicant and its winding is for instance a series-wave printed-circuit winding of 41 turns and eight magnetic poles. Briefly summarized, this winding is made as a two-face circuit comprising two sets of generally radial conductors applied to opposite faces of carrier disc 10, the shape of the conductors being relatively reciprocal from face to face so that through connections ensure the series-wave pattern of the winding by merely interconnecting the registering ends of the conductors on both faces. Such through connections may for instance be made by the well known hole metallization technique.

Figure 2:
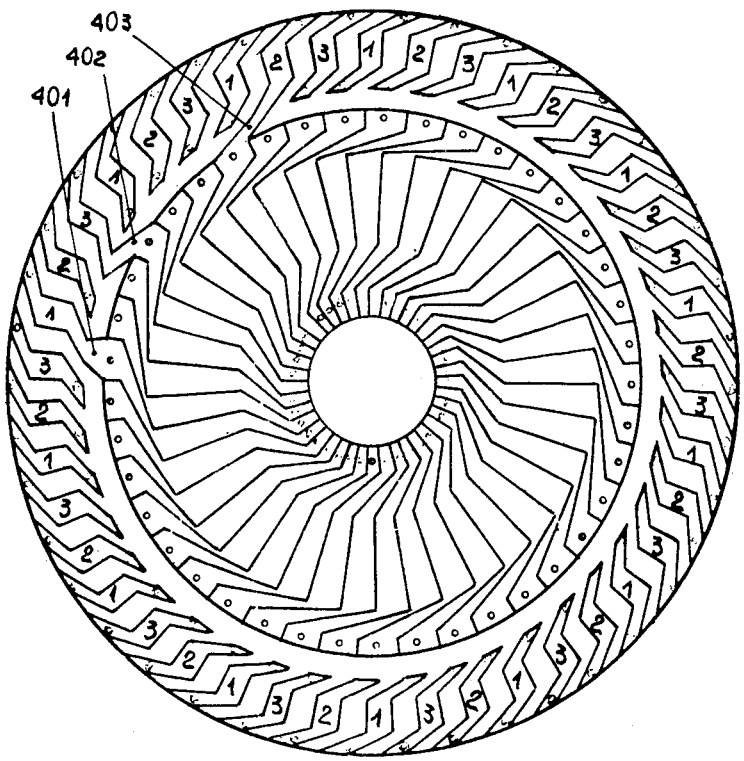
FIG. 2 is a view of one face of the twin windings of said machine.

The outer winding is a three-phase winding having one conductor per pole in each phase winding. It is shown as comprising 84 conductors viz. 42 conductors per face. It is a star-connected winding by means of the metallization connection shown at 300 in FIG. 2 which connects the outputs 301, 302 and 303 of the three phases. Each phase winding has an input, FIG. 2, and these three inputs 401, 402 and 403 are made by metallizations connecting the corresponding input conductors to three taps on the conductors of the inner winding arranged at 120 electrical degrees with respect to the pole pitch of said inner winding. In order to make the phasing quite clear, the conductors of the three phases are numbered 1, 2 and 3 in FIG. 2 and a complete loop may be followed around the winding in said FIG. 2. The polar pitch corresponds to the location of 1.5 conductor on a face. Such an arrangementt is of special advantage for the overlapping of the phases in a multi-phase winding as, of course, any other number of phases than three could be used for putting the invention into practice. It must be noted that at the places of input and output of the phases the through connections are omitted when forming the winding whereas the through-connections are provided elsewhere for normally closing the turns of the two-face winding.

Of course, the actual number of conductors in the windings will be most often higher than the numbers shown in the drawings. Illustratively, for instance, it will be quite simple to obtain by the usual photo-etching process an outer winding with 120 conductors per face, for a rotor of 115 mm. of average diameter of the ring of said winding. As concerns the inner D.C. winding, the increase of conductor number will result in an increse in efficiency and, further, it will most often be of advantage to reduce the number of poles in said D.C. part of the machine.

The stator induced winding may be, if desired, identical to the outer winding of the rotor or else may consist of a spiral of rectangular turns distributed along an annular area, or else again, said induced winding may be provided with different number of conductors and number of phases with respect to the outer inductor winding of the rotor.

What is claimed is:
1. An electrical rotary machine of the axial air-gap type comprising an annular stator, a rotor adjacent said stator and comprising a disc-shaped insulating carrier having two printed-circuit windings formed on inner and outer annular areas thereof, a pair of brushes mounted to bear upon portions of said inner winding, said inner winding having printed-circuit tap extensions integrally connecting certain conductors thereof to certain conductors of said outer winding, whereby the current supplied to said inner winding from said brushes also circulates through said outer winding.

2. A machine according to claim 1, wherein said outer winding is made of several separate phase-windings of overlapping patterns on the annular area covered by said outer winding, said phase windings being separately fed by said taps of the inner winding whereby the outer winding is made an A.C. winding when the inner winding is supplied with direct current.

3. A machine according to claim 2, wherein the number of conductors of said outer winding is much higher than that of said inner winding and including a fixed stator winding inductively coupled with said outer rotor winding and having induced therein a very high frequency current.

References Cited in the file of this patent

UNITED STATES PATENTS 2,970,238     Swiggett  ---------------  Jan. 31, 1961